(12) United States Patent
Bernal et al.

(10) Patent No.: US 9,977,968 B2
(45) Date of Patent: May 22, 2018

(54) SYSTEM AND METHOD FOR RELEVANCE ESTIMATION IN SUMMARIZATION OF VIDEOS OF MULTI-STEP ACTIVITIES

(71) Applicant: Xerox Corporation, Norwalk, CT (US)

(72) Inventors: Edgar A. Bernal, Webster, NY (US); Qun Li, Webster, NY (US); Yun Zhang, Atlanta, GA (US); Jayant Kumar, San Jose, CA (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 101 days.

(21) Appl. No.: 15/061,463

(22) Filed: Mar. 4, 2016

(65) Prior Publication Data

US 2017/0255831 A1    Sep. 7, 2017

(51) Int. Cl.
G06K 9/00        (2006.01)
G06K 9/62        (2006.01)
H04L 29/06       (2006.01)

(52) U.S. Cl.
CPC ..... G06K 9/00751 (2013.01); G06K 9/00718 (2013.01); G06K 9/00765 (2013.01); G06K 9/6227 (2013.01); H04L 65/4084 (2013.01); H04L 67/42 (2013.01); H04L 69/16 (2013.01)

(58) Field of Classification Search
CPC ............ G06K 9/00751; G06K 9/6227; G06K 9/00718; G06K 9/00765; H04L 65/4084; H04L 69/16; H04L 67/42
USPC ......... 382/156, 159, 224; 1/1; 345/419, 502, 345/520; 348/46, E13.074; 712/228
See application file for complete search history.

(56) References Cited

U.S. PATENT DOCUMENTS

| | | | |
|---|---|---|---|
| 6,137,544 A | 10/2000 | Dimitrova et al. | |
| 7,356,082 B1 | 4/2008 | Kuhn | |
| 8,082,426 B2 * | 12/2011 | Paltashev | G06F 9/30087 712/228 |
| 9,105,077 B2 * | 8/2015 | Wersborg | B23K 1/0056 |
| 9,230,159 B1 * | 1/2016 | Vijayanarasimhan | G06K 9/00342 |
| 9,251,598 B2 * | 2/2016 | Wells | G06T 7/2093 |
| 9,262,915 B2 * | 2/2016 | Clem | G08G 1/0112 |
| 9,354,711 B2 * | 5/2016 | Kumar | G06F 3/017 |
| 9,626,788 B2 * | 4/2017 | Corazza | G06T 13/40 |
| 2012/0150854 A1 | 6/2012 | Song et al. | |
| 2014/0100835 A1 * | 4/2014 | Majumdar | G06Q 10/047 703/11 |
| 2015/0310365 A1 * | 10/2015 | Li | G06Q 10/0639 705/7.38 |
| 2015/0310458 A1 * | 10/2015 | Bernal | G06Q 30/0201 382/103 |

(Continued)

OTHER PUBLICATIONS

Zajdel et al., "Cassandra: Audio-Video Sensor Fusion for Aggression Detection", 2007.*

(Continued)

*Primary Examiner* — Aaron W Carter
(74) *Attorney, Agent, or Firm* — Kevin Soules; Kermit D. Lopez; Luis M. Ortiz

(57) ABSTRACT

A method and system for identifying content relevance comprises acquiring video data, mapping the acquired video data to a feature space to obtain a feature representation of the video data, assigning the acquired video data to at least one action class based on the feature representation of the video data, and determining a relevance of the acquired video data.

16 Claims, 10 Drawing Sheets

(56) References Cited

U.S. PATENT DOCUMENTS

2016/0092726 A1* 3/2016 Li ................. G06K 9/00355 345/156
2017/0220854 A1* 8/2017 Yang ............... G06K 9/00335
2017/0255831 A1* 9/2017 Bernal ............. G06K 9/00751

OTHER PUBLICATIONS

Doherty, A. R. et al., "Investigating Keyframe Selection Methods in the Novel Domain of Passively Captured Visual Lifelogs," ACM International Conference on Image and Video Retrieval (2008) Jul. 7-9, Niagara Falls, Canada, 10 pages.

Krizhevsky, A. et al., "ImageNet Classification with Deep Convolutional Neural Networks," NIPS (2012) Lake Tahoe, Nevada, 9 pages.

Lee, Y. J. et al., "Discovering Important People and Objects for Egocentric Video Summarization," IEEE Conference on Computer Vision and Pattern Recognition (2012) Providence, RI, Jun. 16-21, pp. 1346-1353.

Lee, Y. J. et al., "Predicting Important Objects for Egocentric Video Summarization," International Journal of Computer Vision (2015) 114:38-55.

Lu, Z. et al., "Story-Driven Summarization for Egocentric Video," Proceedings of the IEEE Conference on Computer Vision and Pattern Recognition (2013) Portland, OR, Jun. 23-28, pp. 2714-2721.

Raptis, M. et al., "Poselet Key-framing: A Model for Human Activity Recognition," IEEE Conference on Computer Vision and Pattern Recognition, Jun. 23, 2013, pp. 2650-2657.

Shroff, N. et al., "Video Precis: Highlighting Diverse Aspects of Videos," IEEE Transactions on Multimedia (2010) 12(8):853-868.

* cited by examiner

US 9,977,968 B2

SYSTEM AND METHOD FOR RELEVANCE ESTIMATION IN SUMMARIZATION OF VIDEOS OF MULTI-STEP ACTIVITIES

FIELD OF THE INVENTION

Embodiments are generally related to data-processing methods and systems. Embodiments are further related to video-processing methods and systems. Embodiments are additionally related to video-based relevance estimation in videos of multi-step activities.

BACKGROUND

Digital cameras are increasingly being deployed to capture video data. There has been a simultaneous decrease in the cost of mobile and wearable digital cameras. In combination, this has resulted in an ever increasing number of such devices. Consequently, the amount of visual data being acquired grows continuously. By some estimates, it will take an individual over 5 million years to watch the amount of video that will cross global IP networks each month in 2019.

A large portion of the vast amounts of video data being produced goes unprocessed. Prior art methods that exist for extracting meaning from video are either application-specific or heuristic in nature. Therefore, in order to increase the efficiency of processes like human review or machine analysis of video data, there is a need to automatically extract concise and meaningful representations of video.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the disclosed embodiments to provide systems and methods for automated estimation of video content relevance that operate within the context of a supervised action classification application. The embodiments are generic in that they can be applied to egocentric as well as third-person, surveillance-type video. Applications of the embodiments include but are not limited to automated or human-based process verification, semantic video compression, and concise video representation for indexing, retrieval, and preview.

The aforementioned aspects and other objectives and advantages can now be achieved as described herein. Methods and systems for identifying content relevance comprise acquiring video data, mapping the acquired video data to a feature space to obtain a feature representation of the video data, assigning the acquired video data to at least one action class based on the feature representation of the video data, and determining a relevance of the acquired video data.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The particular values and configurations discussed in the following non-limiting examples can be varied and are cited merely to illustrate one or more embodiments and are not intended to limit the scope thereof.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
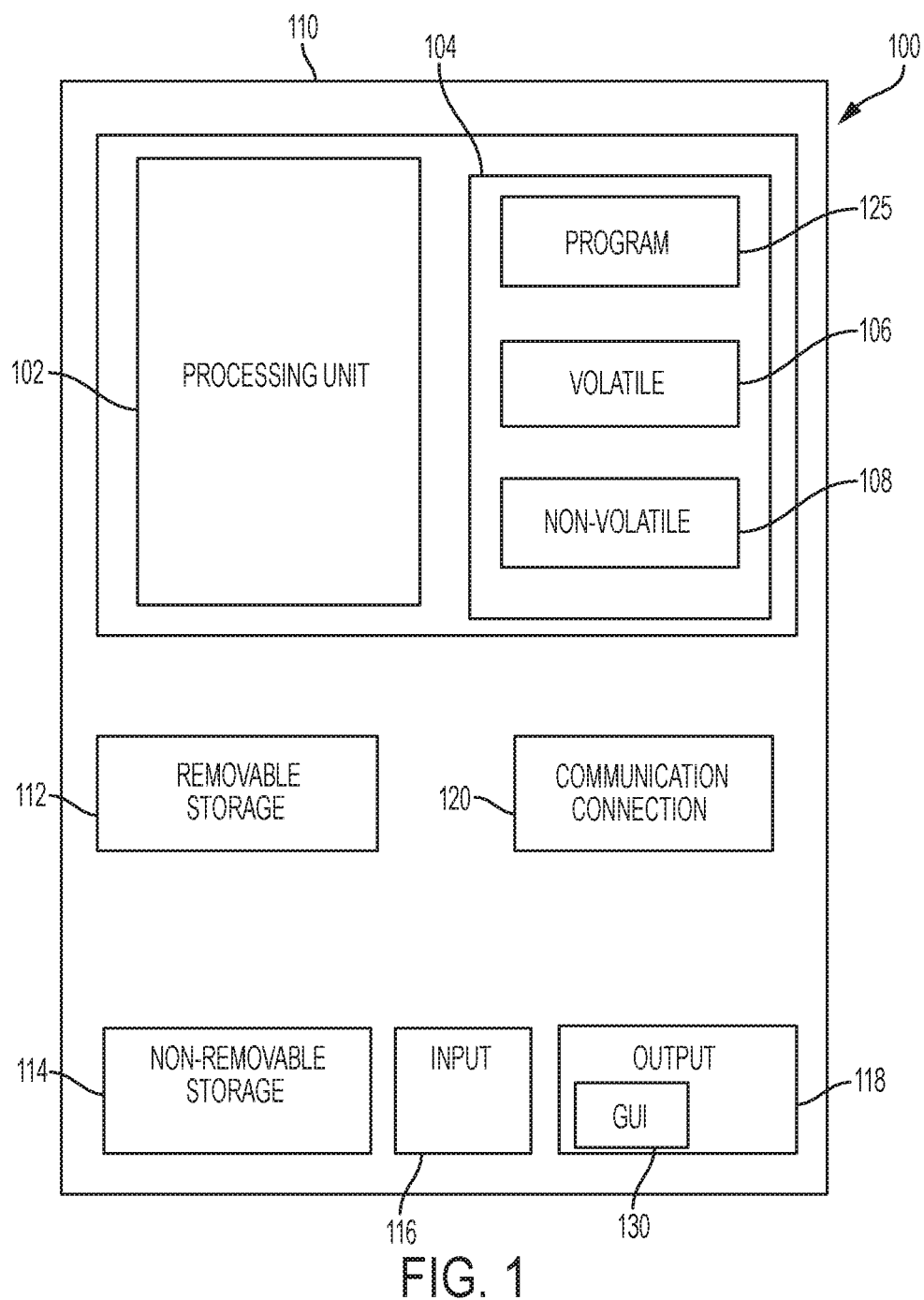
FIG. 1 illustrates a schematic view of a computer system, which can be implemented in accordance with one or more of the disclosed embodiments.
Figure 2:
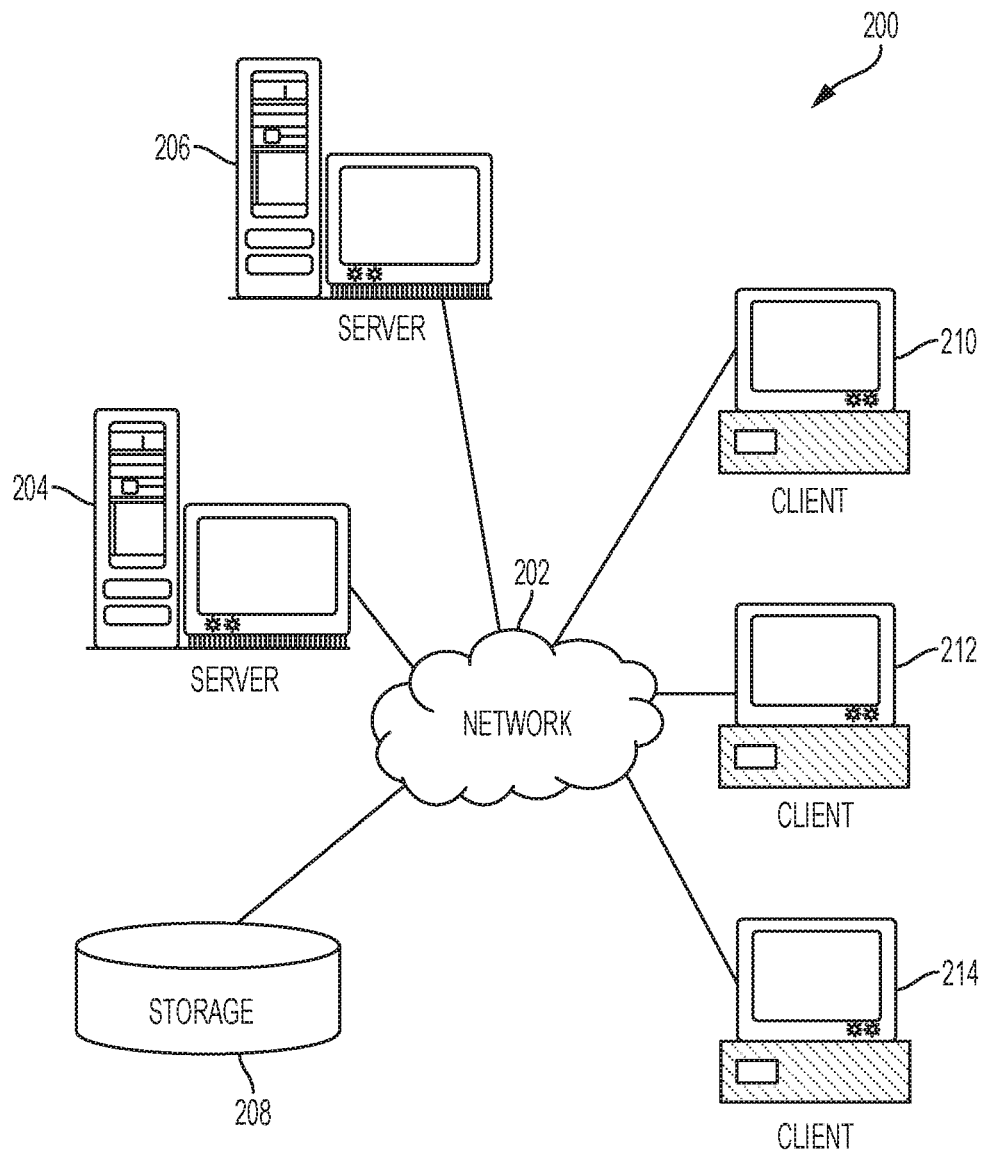
FIG. 2 illustrates a networked architecture, which can be implemented in accordance with one or more of the disclosed embodiments.
Figure 3:
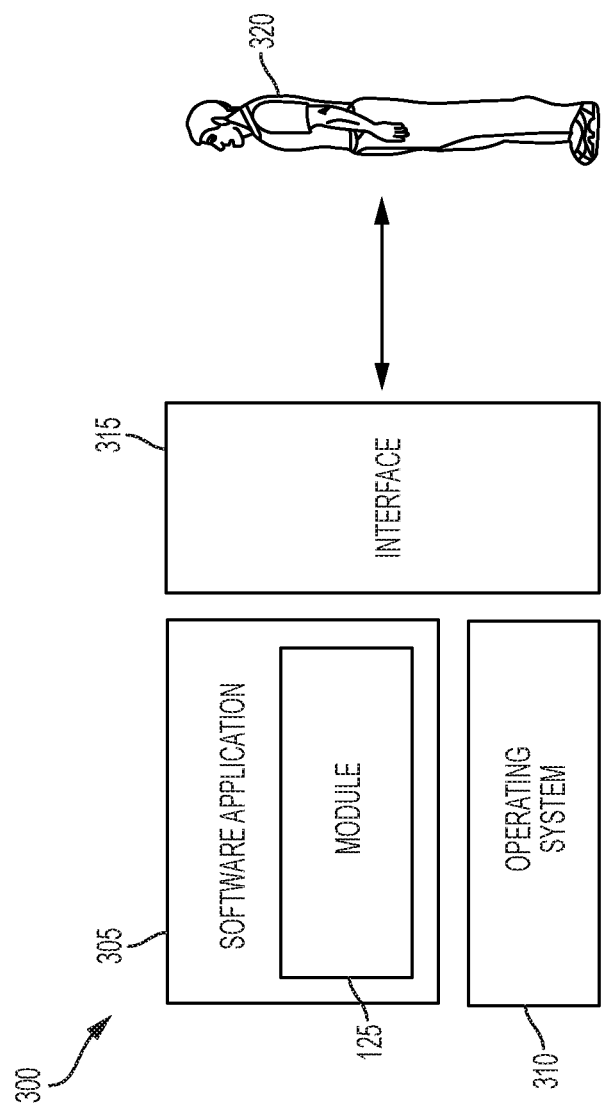
FIG. 3 illustrates a schematic view of a software system including, an operating system, and a user interface, in accordance with the disclosed embodiments.

FIGS. 1-3 are provided as exemplary diagrams of data-processing environments in which aspects of the embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, hand-held devices, printers, copiers, faxes, multi-function devices (MFDs), mobile devices, mobile phones, Smartphones, or other such devices. The remote computer may also include a personal computer (PC), server, router, network PC, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as printers, scanners, fax machines, multi-function devices (MFDs), rendering devices, mobile phones, smartphones, tablet devices, and the like in which embodiments may be implemented. Note that the system 200 can be implemented in the context of a software module such as program module 125. The system 200 includes a network 202 in communication with one or more clients 210, 212, and 214. Network 202 may also be in communication with one or more servers 204 and 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 204 and 206, one or more external devices such as rendering devices, printers, MFDs, mobile devices, and/or a memory storage unit such as, for example, memory or database 208.

In the depicted example, servers 204 and 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, printing devices, MFDs, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, mobile phones, smartphones, tablet devices, multi-processor systems, printers, copiers, fax machines, multi-function devices, data networks, microprocessor-based or programmable consumer electronics, networked personal computers, minicomputers, mainframe computers, servers, and the like.

Note that the term module or node as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface) can serve to display results, whereupon a user 320 may supply additional inputs or terminate a particular session. In some embodiments, operating system 310 and GUI 315 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to certain aspects of embodiments of the present invention, which can be embodied in the context of or require the use of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, and the like. Therefore, the descriptions of the exemplary embodiments, which follow, are for purposes of illustration and not considered a limitation.

The embodiments disclosed herein include systems and methods for automated estimation of video content relevance that operates within the context of a supervised action classification application. The embodiments are generic in that they can be applied to egocentric (that is, video acquired with a wearable camera that captures actions from the viewpoint of the camera user) as well as third-person, surveillance-type video, and video acquired with a vehicle-mounted camera wherein a vehicle can refer to, for example, a sedan, a truck, a sport utility vehicle (SUV), a motorcycle, a bicycle, an airplane, an unmanned aerial vehicle, a remote controlled device, and the like. The embodiments do not rely on the existence of clearly defined shot boundaries or on learning relevance metrics that require large amounts of labeled data. Instead, the embodiments use confidence scores from action classification results in order to estimate the relevance of a frame or sequence of frames of a video containing a multi-step activity or procedure, the action classification being performed to identify the type of action that takes place in the video or a segment thereof. The embodiments are further feature and classifier-agnostic, and add little additional computation to traditional classifier learning and inference stages.

Exemplary embodiments provided herein illustrate the effectiveness of the proposed method on egocentric video. However, it should be appreciated that the embodiments are sufficiently general to be applied to any kind of video, including those containing multi-step procedures. Applications of the embodiments include but are not limited to automated or human-based process verification, semantic video compression, and concise video representation for indexing, retrieval, and preview.

The embodiments herein describe a system and method for relevance estimation of frames or group of frames in summarization of videos of multi-step activities or procedures. Each step in the activity is denoted an action. Classifying an action refers to recognizing the type of action that takes place in a given video or video segment. The system includes a number of modules including a video acquisition module which acquires the video to be summarized; a video representation module which maps the incoming video frames to a feature space that is amenable to action classification; an action classification module which assigns incoming frames or video segments to one of a multiplicity of previously seen action classes; and a relevance estimation module which outputs an estimate of relevance of the incoming frames or video segments based on the output of the action classification module.

Figure 4:
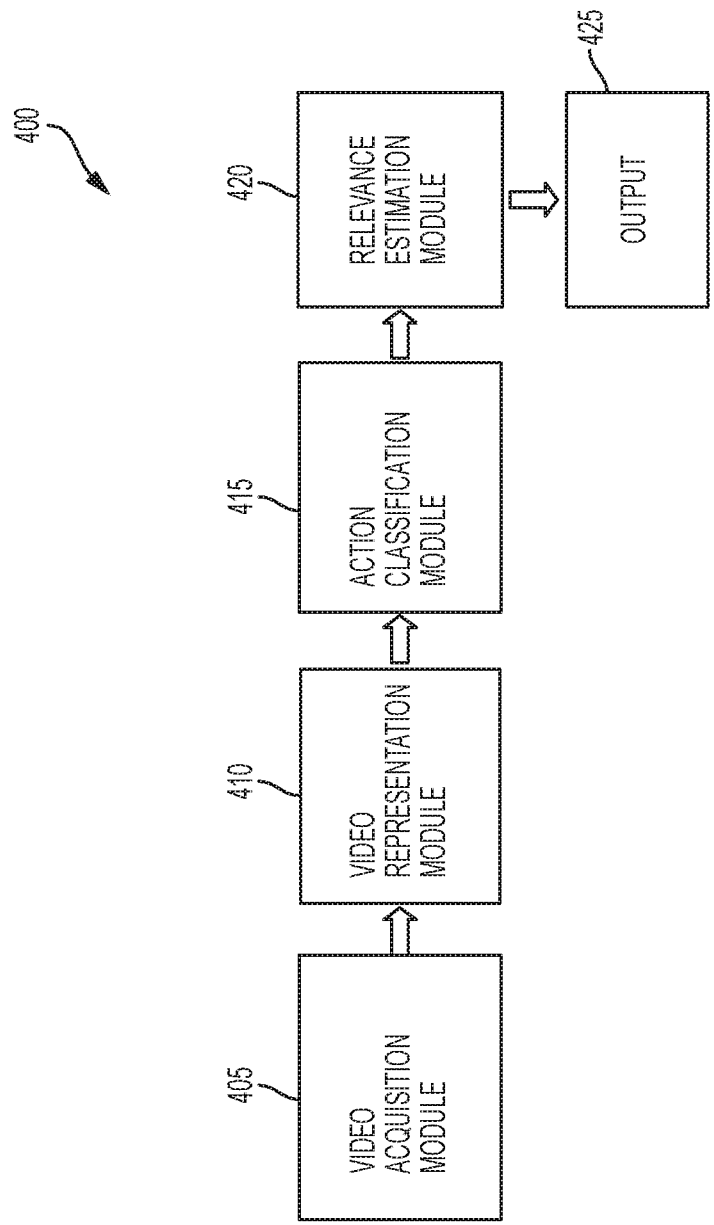
FIG. 4 illustrates a block diagram of a system for identifying content relevance, in accordance with the disclosed embodiments.

FIG. 4 illustrates a block diagram 400 of modules associated with a system for relevance estimation of frames in summarization of videos in accordance with an embodiment of the invention.

Block 405 shows a video acquisition module. The video acquisition module can be embodied as a video camera that acquires video, or other types of data, to be summarized. The video acquisition module can be any image or video capturing device such as a camera, video camera wearable device, etc., that collects egocentric video or image data, or any other kind of video or image data containing multi-step procedures or well-defined human actions. The acquired video or image dataset may comprise one or more frame or frames of egocentric visual data of a multi-step procedure. Examples of such egocentric data include medical procedures, law enforcement activities, etc. Alternatively, the acquired video or image dataset may comprise one or more frame or frames of visual data of a multi-step procedure acquired from a third-person perspective.

Data collected by the video acquisition module 405 is provided to the video representation module 410. The video representation module 410 extracts features from the data, or equivalently, maps the incoming video frames to a feature space that is amenable to action classification. Once acquired, it is common practice to extract features from the data, or equivalently, to map the data onto a feature space or to transform the data into representative features thereof. More generally, features are extracted from the incoming data in order to discard information that may be noisy or irrelevant in the data, and to achieve more concise or compact representation of the original data. Feature space is a term used in the machine learning arts to describe a collection of features that characterize data. Mapping from one feature space to another relates to a function that defines one feature space in terms of the variables from another. In the simplest implementation, the feature space may be identical to the data space, that is, the transformation is the identity function and the features are equivalent to the incoming data.

In one embodiment, the classification framework is used to guide the choice of features in the feature space. This has the advantage that classification performance is easily quantifiable, and so the optimality of the given feature set can be measured. This is in contrast to some prior art methods where the choice of features is guided by the relevance estimation task itself, the performance of which is more difficult to measure.

The video representation model 410 allows the methods and systems described herein to be both feature- and classifier-agnostic, which means it can support a wide range of multi-step process summarization applications. The video representation module 410 can thus extract per-frame, hand-engineered features such as scale-invariant features (SIFT), histogram of oriented gradients (HOG), and local binary patterns (LBP), among others. Hand-engineered features that perform representation of batches of frames or video segments such as 3D SIFT, HOG-3D, space-time interest points (STIP), and dense trajectories (DT) can also be used. Hand-engineered features do not necessarily adapt to the nature of the data or the decision task.

While the systems and methods may use hand-engineered features, hand-engineered features can have limitations in certain situations. The choice of features will largely affect the performance of the system, so domain expertise may be required for the user to make the right feature choice. Also, a degree of fine-tuning of the parameters of the features is often required, which can be time-consuming, and also requires domain expertise. Lastly, hand-engineered features do not necessarily generalize well, so the fact that they work well for a given task doesn't necessarily mean that they will perform well for another task, even when the same set of data modalities is involved in the different tasks.

Thus, in some embodiments the system may also, or alternatively, automatically learn an optimal feature representation given a set of data in support of a given automated decision task. The system may learn a feature representation by means of one or more deep networks. Deep features can be learned from deep architectures including convolution neural networks (CNN), recurrent neural networks (RNN) such as long-short-term memory networks (LSTM), deep autoencoders, deep Boltzmann machines, and the like and can also be used. Note that before features can be extracted from these deep architectures, they usually need to be trained, either in a supervised or an unsupervised manner. Additionally and/or alternatively, pre-trained models such as the AlexNET CNN can be used. Like hand-engineered features, deep features may be extracted from individual frames or from video segments.

The deep network(s) may be part of the system (e.g., embodied in the computing device 110 of FIG. 1), or it may be embodied in a separate device that is in communication with the system. A single deep network may be used or multiple deep networks may be used. In some embodiments, different deep networks or combinations of deep networks may be used for data from different data modalities. Deep networks provide hidden and output variables associated with nodes that are connected in various manners, usually across multiple layers, and with connections between nodes usually being weighted by a real number. The values of the variables associated with a particular node may be computed as a (non-linear) function of weights and variables associated with nodes that have incoming connections to the node in question. In the context of feature learning, the hidden variables in the neural network can be viewed as features. An optimal feature representation may be obtained by finding the set of weights that minimize a loss function between an output elicited by a given input and the label of the input.

Once extracted, it is usually the features, rather than the original data, that are further processed in order to perform decisions or inferences based on the incoming data. For instance, classifiers often operate on feature representations of data in order to make decisions about class membership.

Once the frames of data have been mapped to the desired feature space, they are transferred to the action classification module 415. The action classification module 415 assigns incoming frames, or video segments, to at least one of, and potentially multiple previously seen action classes according to their feature representations.

The action classification module 415 may comprise a classifier that is trained in an offline stage as further detailed herein. Once trained, the classifier is then used to make decisions about the class to which a frame or video segment belongs according to the feature representations. This is done in an online or inference stage. Training the classifier can include learning a set of parameters that optimally discriminates the classes at hand. To that end, a training set comprising feature representations (obtained with the video representation module 410) of a set of labeled data can be utilized, and an optimization task that minimizes a classification cost function can be performed. Once the set of optimal classifier parameters are known, the class to which video frames belong can be inferred using the trained classifier.

As previously noted, the proposed embodiments are both feature- and classifier-agnostic, in other words, they are independent of the choice of features and classifier. In the action classification module 415, a classifier comprising a support vector machine (SVM), a neural network, a decision tree, a random forest, an expectation-maximization (EM) algorithm, or a k-nearest neighbor (k-NN) clustering algorithm can be used. These options are discussed in turn below.

In one embodiment, an SVM can be used for classification. In this example, for simplicity, but without loss of generality, the operation of a two-class, linear kernel SVM is described. In this context, let $y_i$ denote the class ($y_i$ equals either +1 or −1) corresponding to the n-dimensional feature representation $x_i \in R^n$ of the i-th sample, or i-th video frame or video segment. The training stage of an SVM classifier includes finding the optimal w given a set of labeled training samples for which the class is known, where w denotes the normal vector to the hyperplane that best separates samples from both classes. The hyperplane comprises the set of points x in the feature space that satisfy equation (1) if the hyperplane contains the origin, or equation (2) if not.

$$w \cdot x = 0 \quad (1)$$

$$w \cdot x + b = 0 \quad (2)$$

When the training data is linearly separable, the training stage finds the w that maximizes the distance between the hyperplanes as shown in equation (3) and equation (4) which bound class +1 and −1 respectively:

$$w \cdot x + b = +1 \quad (3)$$

$$w \cdot x + b = -1 \quad (4)$$

This is equivalent to solving the following optimization task of minimizing the absolute value of w subject to equation (5).

$$y_i(w \cdot x_i + b) \geq 1 \quad (5)$$

At the inference stage, and once the optimal w has been found from the training data, the class for a test sample $x_t$ can be inferred by computing the sign of equation (6)

$$(w \cdot x_t + b) \quad (6)$$

In another example, a neural network with a softmax output layer can be used. A neural network is an interconnected set of nodes typically arranged in layers. The inputs to the nodes are passed through a (traditionally) non-linear activation function and then multiplied by a weight associated with the outgoing connecting link before being input to the destination node, where the process is repeated.

Training a neural network requires learning an optimal set of weights in the connections given an objective or task measured by a cost function. When the neural network is used for classification, a softmax layer can be implemented (with the number of output nodes equal to the number of classes) as an output layer or last layer. Let K denote the number of classes; then $z_k$, the output of the k-th softmax node, is computed as shown in equation (7):

$$\hat{z}_k = \frac{e^{z_k}}{\sum_{k=1}^{K} e^{z_k}} \quad (7)$$

wherein $z_j$ is the input to softmax node j. Under this framework, during training, and in one embodiment, the optimal values of the network weights can be chosen as the values that minimize the cross-entropy given by equation (8):

$$E = -\sum_{k=1}^{K} y_k \log(\hat{z}_k) \quad (8)$$

wherein $z_k$ is the output of the network to a given sample belonging to class j having been fed as input, and $y = \{y_k\}$ is the one-hot vector of length K indicating the class to which the input sample belongs. In other words, all entries of vector y, $y_k$ are equal to 0, except the j-th entry which is equal to 1. Other cost functions can be used in alternative embodiments such as the mean squared error, a divergence, and other distance metrics between the actual output and the desired output.

At the inference stage, a sample of unknown class is fed to the network, and the outputs $z_k$ are interpreted as probabilities; specifically, for an input x, $z_k = p(x \epsilon k | x)$ (note that $1 \geq z_k \geq 0$ and $z_1 + \ldots + z_K = 1$). It is commonplace to assign the input x to class j such that $z_j \geq z_k$ for all $1 \leq k \leq K$, but other criteria for deciding the class membership of the input can be implemented.

In another example, expectation minimization (EM) can be used. Expectation-maximization provides one way to estimate the parameters of a parametric distribution (namely, a mixture of Gaussians) to a set of observed data that is taken as multiple instantiations of an underlying random variable. Specifically, let x denote the random variable of which the feature representations $x_i \epsilon R^n$ of the labeled training data set represent multiple instantiations. At training, EM enables the estimation of the set of parameters θ that best describe the statistical behavior of the training data. Specifically, EM enables the estimation of the set of parameters given by equation (9) that maximize equation (10).

$$\theta = \{w_i, \mu_i, \sum_i\} \quad (9)$$

$$p(x; \theta) = \sum_{i=1}^{K} w_i \phi(x, \mu_i, \sum_i) \quad (10)$$

These parameters best describe the behavior of the random variable x as observed through the training samples $x_i$.

In one embodiment, p(x; θ) is a multivariate Gaussian mixture model, $w_i$ is an estimate of the weight of the i-th Gaussian component in the mixture, $\mu_i$ is the mean value of the i-th Gaussian component in the mixture, $\Sigma_i$ is the covariance matrix of the i-th Gaussian component in the mixture, and φ(·) is the Gaussian probability density function. In the context of a multi-class classification task, K is chosen to be equal to the number of classes. At the inference stage, when the class of $x_i$, a new instantiation of the random variable x is to be determined, the class corresponding to the mixture component k for which equation (11) is largest, is selected.

$$\Phi(x_j, \mu_k, \Sigma_k) \quad (11)$$

In yet another example, a k nearest neighbor classification can be used. According to the k nearest-neighbor classification scheme, the feature representations of the training samples are considered points in a multi-dimensional space. When the class of a new sample is to be inferred, the feature representation $x \epsilon R^n$ of the sample is computed, and the k nearest neighbors among the samples in the training set are determined. The class of the incoming frame is assigned to the class to which the majority of the k nearest neighbors belongs.

In the implementation of the action classification module 415, two classifiers (among a plurality of different classifiers) can be used. The classifiers can be trained on the features extracted from a fine-tuned AlexNET CNN. In one embodiment, the classifier is trained using the softmax layer in the CNN. In another embodiment, the classifier is trained using a seven two-class (one vs. rest) linear kernel SVM as shown.

Output from the action classification module 415 is provided as input into the relevance estimation module 420. The relevance estimation module 420 outputs an estimate of relevance 425 of the incoming frames or video segments based on the output of the action classification module 415. The operation of this module is premised on the concept that highly discriminative frames and segments (i.e., samples that are classified with high confidence) will typically correspond with samples that are highly representative of their class.

Figure 5A:
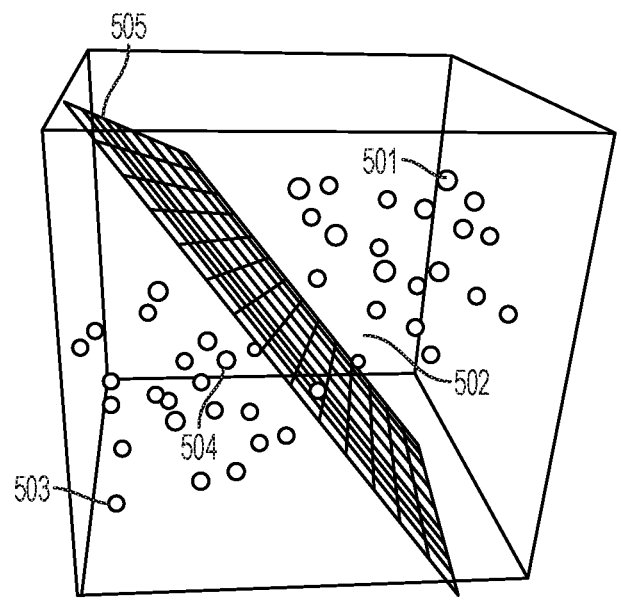
FIG. 5A illustrates a graphical representation of linearly separable classes, in accordance with the disclosed embodiments.
Figure 5B:
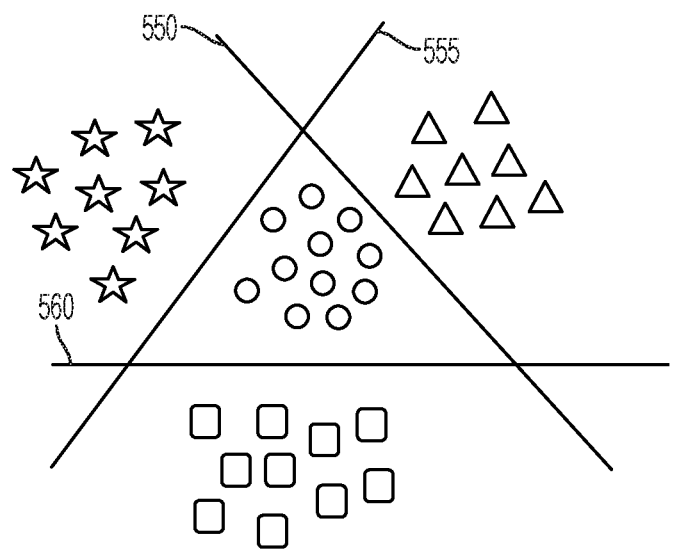
FIG. 5B illustrates a graphical representation of multiple linearly separable classes, in accordance with the disclosed embodiments.

For example, FIG. 5A illustrates a two-class classification problem where the classes are linearly separable. Intuitively, it should be expected that the farther a given sample 501 is from the separating hyperplane 505, the more discriminative and representative it will be, and vice-versa. Thus, sample 501 is more representative than sample 502 and sample 503 is more representative than sample 504. FIG. 5B illustrates a multi-class classification task. In this case, the distance to all inter-class boundaries 550, 555, and 560 must be maximized simultaneously. When the classes are not separable, samples that fall on the wrong side of the hyperplane are considered to be not representative.

Figure 6:
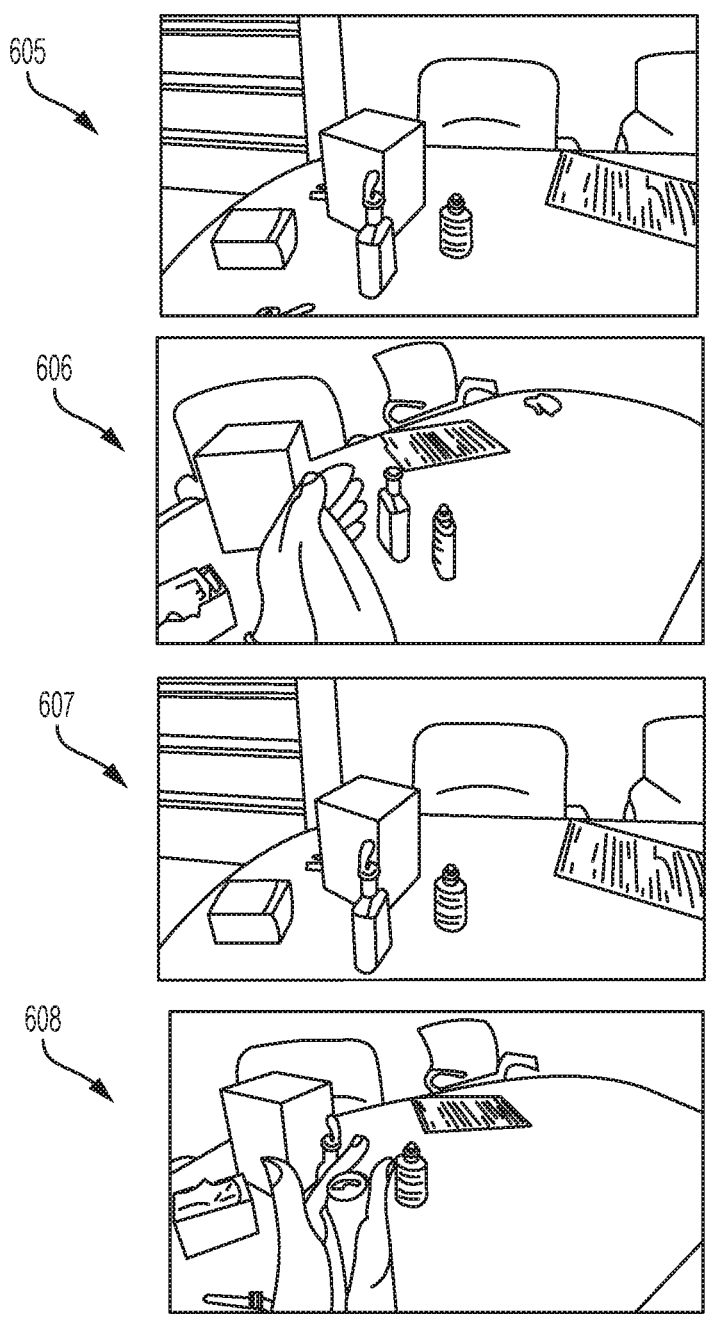
FIG. 6 illustrates sample frames of video data, in accordance with the disclosed embodiments.

In order to further illustrate this concept, FIG. 6 provides an illustration of four frames of video 605, 606, 607, and 608 associated with a hand-washing and bottle-rolling actions in an insulin self-injection procedure. In FIG. 6, frames 605 and 606 correspond with a hand washing action and frames 607 and 608 correspond with a bottle-rolling action. Note that frame 606 associated with hand washing and frame 608 associated with bottle rolling are highly descriptive of their respective associated action. As such, these frames will be projected onto points in space that are relatively far apart, because they are highly discriminative. By contrast, frame 605 associated with hand washing and frame 607 associated with bottle rolling are highly non-descriptive. Indeed, despite the fact that the frames are associated with different actions they look nearly identical. These representations will therefore be somewhat close together in a feature space, because they are less discriminative.

With this in mind, the relevance estimation module 420 uses a classification confidence metric inferred from a classification score as a surrogate metric for relevance. This operation is accomplished in conjunction with the classifiers described in the context of the action classification module 415.

In the case of a support vector machine, recall that at the inference stage, the class for a test sample $x_j$ can be inferred by computing the sign of equation (6). The sign of this operation indicates on which side of the hyperplane described by w and b sample $x_j$ is located. Similarly, the magnitude $|w \cdot x_j + b|$ is indicative of the distance of the sample to the hyperplane; the larger this magnitude, the larger the classification confidence. It should be appreciated that although this exemplary embodiment describes linear-kernel SVMs, in other embodiments it can be extended to SVMs with non-linear kernels.

In the case of multi-class classification, the embodiments disclosed herein include constructing multiple one vs. many SVM classifiers. In such a case, and for a given sample, a vector of normalized scores can be assembled for each sample, as shown in equation 12:

$$[|w_1 \cdot x_j + b|, |w_2 \cdot x_j + b|, \ldots, |w_n \cdot x_j + b|]/(|w_1 \cdot x_j + b| + |w_2 \cdot x_j + b| + \ldots + |w_n \cdot x_j + b|) \quad (12)$$

In another embodiment, a neural network with softmax output layer, as described above with respect to the action classification module 415, may be used with the relevance estimation module 420. In such an embodiment, at the inference stage a sample of unknown class is fed to the network. The outputs $z_k$ are interpreted as probabilities; specifically, for an input x, $z_k = p(x \in k|x)$ (note that $1 \geq z_k \geq 0$ and $z_1 + \ldots + z_K = 1$). In this embodiment, the input x can be assigned to class j such that $z_j \geq z_k$ for all $1 \leq k \leq K$. The larger the probability $z_k$, the larger the confidence in the classification. In an alternative embodiment, the larger the ratio of $z_j$ to the sum of the remaining $z_k$, the larger the confidence in the classification. Other criteria for estimating classification confidence can be used.

In yet another embodiment, expectation minimization, as described above with respect to the action classification module 415, can be used. In this embodiment, at the inference stage, for the class of $x_j$, a new instantiation of the random variable x can be determined. The class corresponding to the mixture component k for which equation (11) is largest is selected. The larger the value of equation (11), the larger the confidence in the classification.

In yet another embodiment, a k nearest neighbor framework, as described above with respect to the action classification module 415 can be used with the relevance estimation module 420. As discussed above, in the k nearest neighbor framework, the class of the incoming sample is assigned to the class to which the majority of the k nearest neighbors belongs. In this case, a few different metrics can be used as a measure of confidence.

In one case, the number of the k nearest neighbors that were in agreement when making the class assignment can be used. The larger the number, the more confident the classification decision is. Note that this metric is discrete and may not provide enough relevance sensitivity, depending on the application. If a finer relevance scale is desired, then the total distance to the nearest neighbors that led to the class assignment can be used. In such a case, the smaller the distance, the more confident the classification decision is. A combination of these two criteria can also be used. It is noteworthy that in other embodiments, any monotonically non-decreasing function of the confidence metrics described above can alternatively be used as metrics of relevance.

While the embodiments described above illustrate the relevance estimation process for a given frame or video segment, consistency across temporally neighboring frames in a video may be used to help determine both classification and relevance scores. This can be achieved by enforcing a degree of temporal smoothness in the relevance scores. In one embodiment, relevance is only directly estimated for a subset of frames or video segments, and indirectly inferred for the remaining set of frames or video segments based on the estimated values. In another embodiment, relevance can be estimated from every frame or video segment and the resulting temporal sequence of relevance scores may be smoothed by applying a temporal filter such as a window average. In yet another embodiment, relevance for a given frame or video segment may be estimated via the combination of classification-based relevance and a history of previously estimated relevance scores. This can be achieved, for example, by implementing an autoregressive moving average model.

Figure 7:
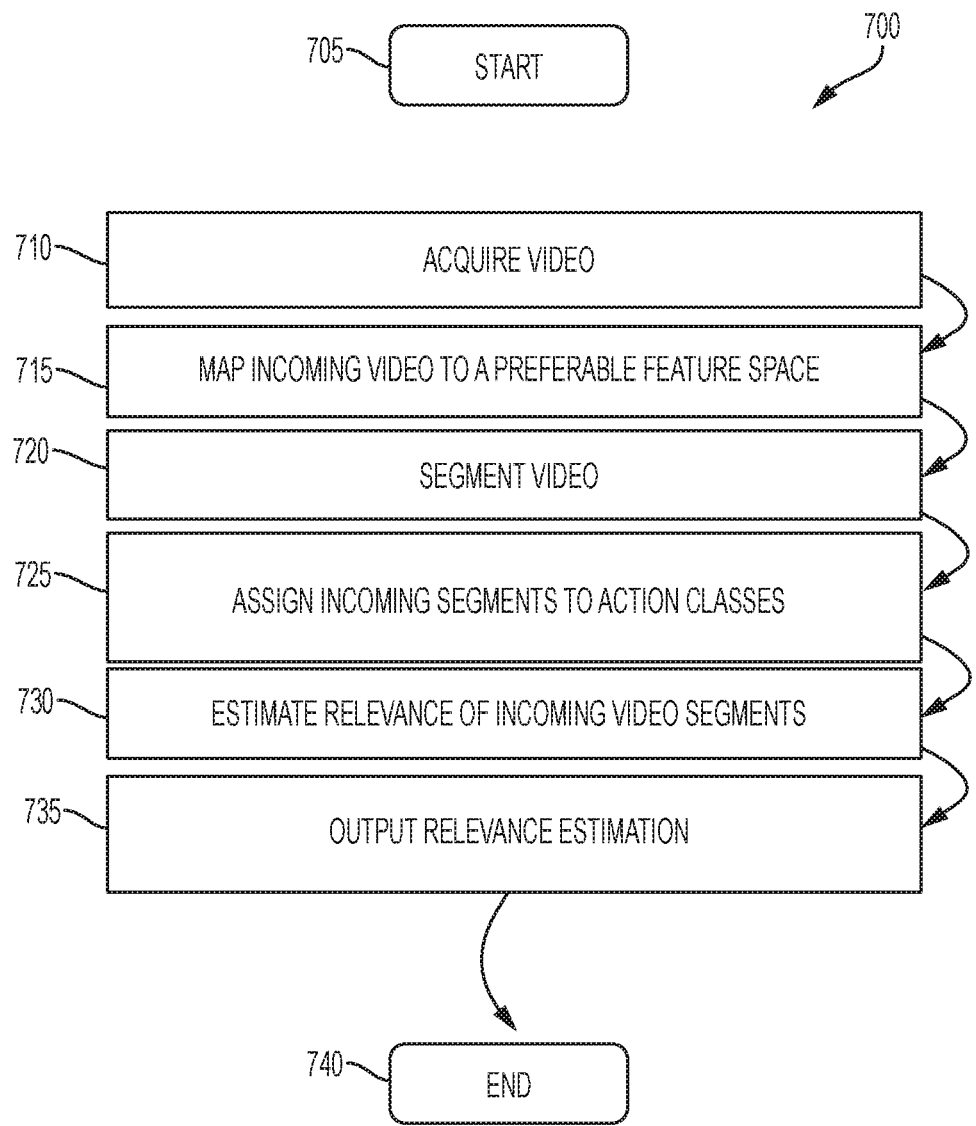
FIG. 7 illustrates a flow chart of logical operational steps associated with a method for identifying content relevance, in accordance with the disclosed embodiments.

FIG. 7 provides a flow chart of logical operational steps associated with a method 700 for relevance estimation of frames, or group of frames, in summarization of videos of multi-step activities or procedures. The method begins at step 705.

At step 710, a video acquisition module 405 acquires the video to be summarized. Next, a video representation module 410 maps the incoming video frames to a feature space that is amenable to action classification, as shown at step 715.

At step 720, the video can be segmented into frames or groups of frames. It should be understood that this step may be completed at any stage after the video is acquired at step 710. An action classification module 415 then assigns the incoming frames or video segments to one of a selection of action classes, as shown at 725.

At step 730, a relevance estimation module 420 determines an estimate of the relevance of the incoming frames or video segments according to the output from the action classification module. Finally at step 735, the relevance estimation module 420 outputs an estimated relevance of the frames or video segments. The method ends at step 740.

Support for the performance of the embodiments disclosed herein is provided in FIG. 8 and FIG. 9. In order to verify the performance of the embodiments described herein, two different classification schemes were constructed on a dataset of video frames showing the self-injection of insulin. The selected video was acquired of a number of subjects involved in a multi-step procedure. The multi-step procedure comprised a multi-step activity including seven different steps conducive to self-insulin injection. The seven steps or actions involved in the procedure include: (1) hand sanitization, (2) insulin rolling, (3) pull air into syringe, (4) withdraw insulin, (5) clean injection site, (6) inject insulin, and (7) dispose of needle. It should be appreciated that this multi-step procedure is exemplary and that the embodiments can be similarly applied to any such dataset. The embodiments disclosed herein are generic in that they can be applied to egocentric as well as third-person, surveillance-type video and video acquired with a vehicle-mounted camera wherein a vehicle can refer to, for example, a sedan, a truck, a sport utility vehicle (SUV), a motorcycle, a bicycle, an airplane, an unmanned aerial vehicle, a remote controlled device, and the like. The methods and systems do not rely on the existence of clearly defined shot boundaries or on learning relevance metrics that require large amounts of labeled data. The methods and systems are also feature- and classifier-agnostic.

For both classification schemes, the extracted features were obtained from the activation of the last hidden layer in the fine-tuned AlexNET CNN. In one case, the output of the 7-class softmax layer was used as a classifier; in the other case, seven two-class linear-kernel SVMs were used in a one vs. all fashion.

Figure 8A:
FIG. 8A illustrates selected video frames associated with a hand washing action, in accordance with the disclosed embodiments.
Figure 8B:
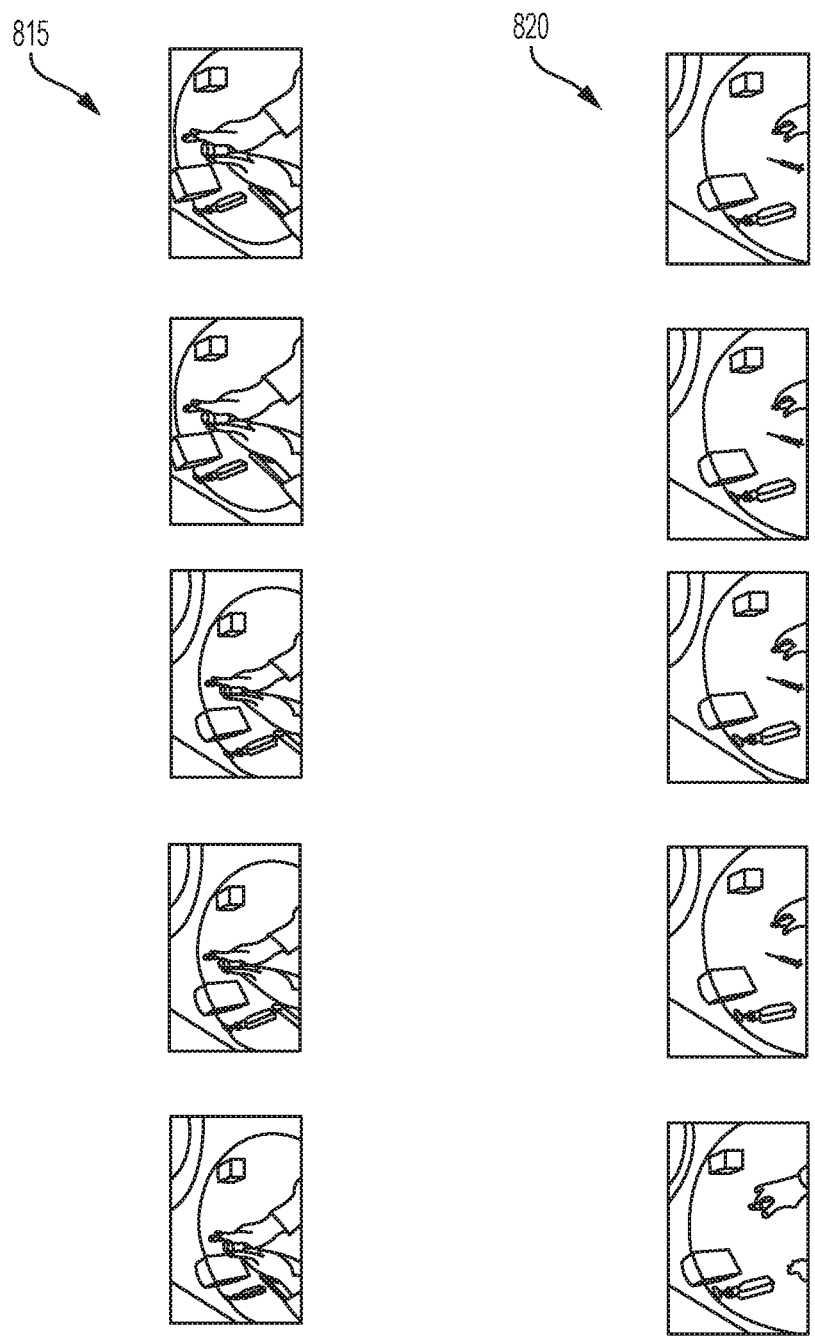
FIG. 8B illustrates selected video frames associated with a bottle rolling action, in accordance with the disclosed embodiments.
Figure 9A:
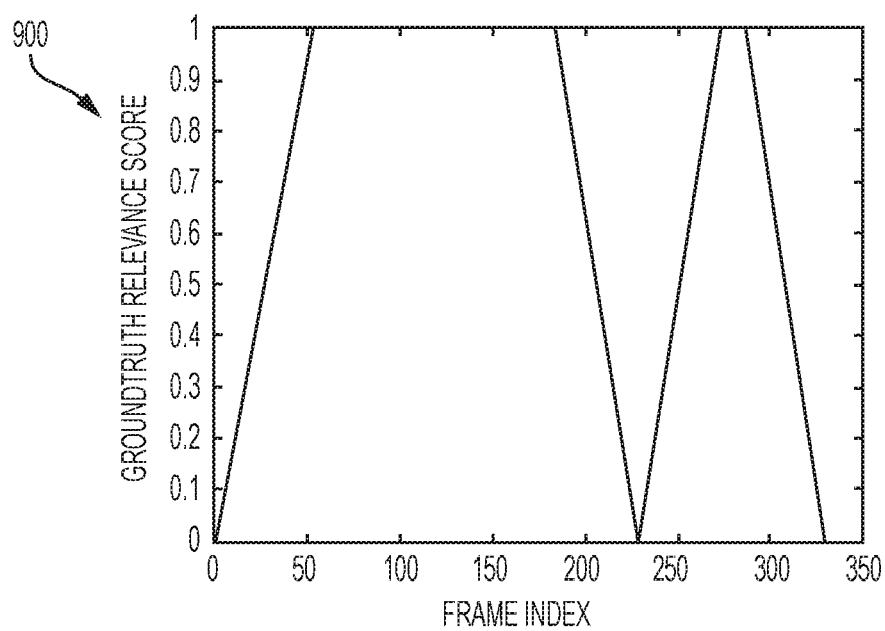
FIG. 9A illustrates a chart of ground truth relevance scores, in accordance with the disclosed embodiments.

FIGS. 8A and 8B illustrates the top five frames and bottom five frames selected relative to classification confidence (and thus, relevance) by the CNN and SVM classifiers. FIG. 8A illustrates the top five frames 805 with the highest confidence (i.e., relevance) and the bottom five frames 810 with the lowest confidence for a hand-washing action. FIG. 8B illustrates the top five frames 815 with the highest confidence and the bottom five frames 820 with the lowest confidence for the bottle-rolling actions. As FIGS. 8A and 8B illustrate, the classification confidence is a good surrogate metric to accurately estimate relevance in a video of a multi-step procedure.

Figure 9B:
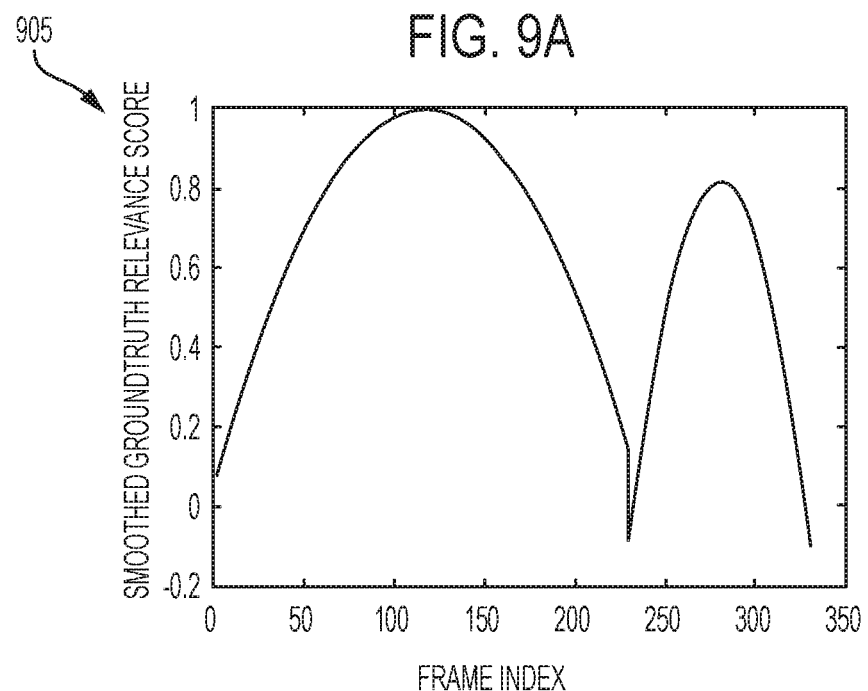
FIG. 9B illustrates a chart of ground truth relevance scores, in accordance with the disclosed embodiments.

Although relevance is difficult to quantify objectively, a human observer was asked to score the relevance (between 0 and 1) of a few select frames within each video clip. The end points of the straight lines in chart 900 are representative of these selection in FIG. 9A. The selection were then piece-wise linearly graphed as shown in chart 900 of FIG. 9A. FIG. 9B illustrates chart 905 showing the data graphed quadratically. The average relevance score of the frames selected according to the embodiments disclosed herein were 0.86 and 0.78 relative to the linearly and quadratically interpolated scores, respectively. This shows there is a good degree of correlation between human assessment of relevance and the automated assessment being produced by the methods and systems disclosed herein.

Based on the foregoing, it can be appreciated that a number of embodiments, preferred and alternative, are disclosed herein. For example, in one embodiment, a method for identifying content relevance in a video stream comprises acquiring video data; mapping the acquired video data to a feature space to obtain a feature representation of the video data; assigning the acquired video data, via the use of a classifier, to at least one action class based on the feature representation of the video data; and determining a relevance of the acquired video data based on the classifier output. In an embodiment, the method comprises segmenting the video data into at least one of single frames and groups of frames.

In an embodiment, determining a relevance of the acquired video data based on the classifier output further comprises enforcing a temporal smoothness requirement on at least one relevance score.

In an embodiment, the video data comprises one of: video acquired with an egocentric or wearable device, video acquired with a vehicle-mounted device, and surveillance or third-person view video. The extracted features comprise at least one of deep features, and hand-engineered features.

In one embodiment, a classifier comprises a support vector machine described by parameters w and b, and a magnitude of a classification score $|w \cdot x_j + b|$ for an input $x_j$ is used to estimate the relevance of the acquired video data.

In another embodiment, the classifier comprises a neural network wherein estimating the relevance of the acquired video data further comprises estimating a relevance of an input sample $x_j$ based on outputs $z_k$ where $1 \leq k \leq K$, and K is a number of classes.

In an embodiment, the hand-engineered features comprise at least one of scale-invariant features, interest point and descriptors thereof, dense trajectories, histogram of oriented gradients, and local binary patterns.

In another embodiment, the deep features are learned via the use of at least one of a long-short term memory network, a convolutional network, an autoencoder, and a deep Boltzmann machine.

In another embodiment, an offline training stage comprises training the classifier to optimally discriminate between a plurality of different action classes according to their corresponding feature representations. The classifier comprises at least one of a support vector machine, a neural network, a decision tree, an expectation-maximization algorithm, and a k-nearest neighbor clustering algorithm.

In another embodiment, determining a relevance of the acquired video data based on the classifier output further comprises assigning the acquired data a classification confidence score and converting the classification confidence score to a relevance score.

In another embodiment, a system for identifying content relevance comprises a video acquisition module for acquiring video data; a processor; a data bus coupled to the processor; and a computer-usable medium embodying computer program code, the computer-usable medium being coupled to the data bus, the computer program code comprising instructions executable by the processor and configured for mapping the acquired video data to a feature space to obtain a feature representation of the video data, assigning the acquired video data, via the use of a classifier, to at least one action class based on the feature representation of the video data, and determining a relevance of the acquired video data based on the classifier output. In an embodiment, the system includes segmenting the video data into at least one of a series of single frames and a series of groups of frames.

In another embodiment, determining a relevance of the acquired video data based on the classifier output further comprises enforcing a temporal smoothness requirement on at least one relevance score.

In an embodiment, the video data comprises at least one frame of video acquired with an egocentric or wearable device, video acquired with a vehicle-mounted device, and surveillance or third-person view video. The extracted features comprise at least one of deep features and hand-engineered features.

In an embodiment, the classifier comprises a support vector machine described by parameters w and b, and a magnitude of a classification score $|w \cdot x_j + b|$ for an input $x_j$ is used to estimate the relevance of the acquired video data.

In another embodiment, the classifier comprises a neural network wherein estimating the relevance of the acquired video data further comprises estimating a relevance of an input sample $x_j$ based on outputs $z_k$ where $1 \leq k \leq K$, and K is a number of classes.

In an embodiment, the hand-engineered features comprise at least one of scale-invariant features, interest point and descriptors thereof, dense trajectories, histogram of oriented gradients, and local binary patterns.

In an embodiment, the deep features are learned via the use of at least one of a long-short term memory network, a convolutional network, an autoencoder, and a deep Boltzmann machine.

The system further comprises an offline training stage comprising training the classifier to optimally discriminate between a plurality of different action classes according to their corresponding feature representations. The classifier comprises at least one of a support vector machine, a neural network, a decision tree, an expectation-maximization algorithm, and a k-nearest neighbor clustering algorithm.

In an embodiment, determining a relevance of the acquired video data based on the classifier output further comprises assigning the acquired data a classification confidence score and converting the classification confidence score to a relevance score.

In yet another embodiment, a processor-readable medium storing computer code representing instructions to cause a process for identifying content relevance, the computer code comprises code to train a classifier to optimally discriminate between a plurality of different action classes according to the feature representations; and in an online stage acquire video data, the video data comprising one of video acquired with an egocentric or wearable device; video acquired with a vehicle-mounted device; and surveillance or third-person view video; segment the video data into at least one of a series of single frames and a series of groups of frames; map the acquired video data to a feature space to obtain a feature representation of the video data; assign the acquired video data, via the use of a classifier, to at least one action class based on the feature representation of the video data; and assign the acquired data a classification confidence score and convert the classification confidence score to a relevance score to determine a relevance of the acquired video data based on the classifier output.

In another embodiment of the processor-readable medium, the extracted features comprise at least one of deep features, wherein the deep features are learned via the use of at least one of: a long-short term memory network, a convolutional network, an autoencoder, and a deep Boltzmann machine; and hand-engineered features, wherein the hand-engineered features comprise at least one of scale-invariant features, interest point and descriptors thereof, dense trajectories, histogram of oriented gradients, and local binary patterns.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A computer implemented method for identifying content relevance in a video stream, said method comprising:
   acquiring at a computer, video data from a video camera:
   mapping extracted features of said acquired video data to a feature space to obtain a feature representation of said video data;
   assigning said acquired video data, with a classifier, to at least one action class based on said feature representation of said video data, said classifier comprising at least one of a support vector machine, a neural network, a decision tree, an expectation-maximization algorithm, and a k-nearest neighbor clustering algorithm; and
   determining a relevance of said acquired video data based on said at least one action class assigned, wherein determining a relevance of said acquired video data based on said at least one action class assigned comprises:
     assigning said acquired video data a classification confidence score; and
     converting said classification confidence score to a relevance score.

2. The method of claim 1 wherein said video data comprises one of:
   video acquired with an egocentric or wearable device;
   video acquired with a vehicle-mounted device; and
   surveillance or third-person view video.

3. The method of claim 1 wherein determining a relevance of said acquired video data based on said classifier output further comprises:
   enforcing a temporal smoothness requirement on at least one relevance score.

4. The method of claim 1 wherein said extracted features comprise at least one of:
   deep features; and
   hand-engineered features.

5. The method of claim 1 wherein said classifier comprises a support vector machine described by parameters w and b, and wherein a magnitude of a classification score $|w \cdot xj+b|$ for an input xj is used to estimate said relevance of said acquired video data.

6. The method of claim 1 wherein said classifier comprises a neural network wherein estimating said relevance of said acquired video data further comprises estimating a relevance of an input sample xj based on outputs zk where 1≤k≤K, and K is a number of classes.

7. The method of claim 1 further comprising an offline training stage comprising training said classifier to optimally discriminate between a plurality of different action classes according to their corresponding feature representations.

8. A system for identifying content relevance, said system comprising:
 a video acquisition module comprising a video camera for acquiring video data;
 a processor;
 a data bus coupled to said processor; and
 a computer-usable medium embodying computer program code, said computer-usable medium being coupled to said data bus, said computer program code comprising instructions executable by said processor and configured for:
  mapping extracted features of said acquired video data to a feature space to obtain a feature representation of said video data;
  assigning said acquired video data, via the use of a classifier, to at least one action class based on said feature representation of said video data, said classifier comprising at least one of a support vector machine, a neural network, a decision tree, an expectation-maximization algorithm, and a k-nearest neighbor clustering algorithm: and
  determining a relevance of said acquired video data based on said at least one action class assigned, wherein determining a relevance of said acquired video data based on said at least one action class assigned comprises:
   assigning said acquired video data a classification confidence score; and
   converting said classification confidence score to a relevance score.

9. The system of claim 8 wherein said video data comprises at least one frame of:
 video acquired with an egocentric or wearable device;
 video acquired with a vehicle-mounted device; or
 surveillance or third-person view video.

10. The system of claim 8 wherein determining a relevance of said acquired video data based on said classifier output further comprises enforcing a temporal smoothness requirement on at least one relevance score.

11. The system of claim 8 wherein said extracted features comprises at least one of:
 deep features; and
 hand-engineered features.

12. The system of claim 8 wherein said classifier comprises a support vector machine described by parameters w and b, and wherein a magnitude of a classification score $|w \cdot xj+b|$ for an input xj is used to estimate said relevance of said acquired video data.

13. The system of claim 8 wherein said classifier comprises a neural network wherein estimating said relevance of said acquired video data further comprises estimating a relevance of an input sample xj based on outputs zk where 1≤k≤K, and K is a number of classes.

14. The system of claim 8 wherein said computer program code comprising instructions executable by said processor further configured for an offline training stage comprising training said classifier to optimally discriminate between a plurality of different action classes according to their corresponding feature representations.

15. A non-transitory processor-readable medium storing computer code representing instructions to cause a process for identifying content relevance, said computer code comprising code to:
 train a classifier to optimally discriminate between a plurality of different action classes according to said feature representations, said classifier comprising at least one of a support vector machine, a neural network, a decision tree, an expectation-maximization algorithm, and a k-nearest neighbor clustering algorithm; and
 in an online stage:
  acquire video data said video data comprising one of video acquired with an egocentric or wearable device; video acquired with a vehicle-mounted device; and surveillance or third-person view video;
  segment said video data into at least one of a series of single frames and a series of groups of frames;
  map extracted features of said acquired video data to a feature space to obtain a feature representation of said video data;
  assign said acquired video data, via the use of a classifier, to at least one action class based on said feature representation of said video data; and
  assign said acquired video data a classification confidence score and convert said classification confidence score to a relevance score to determine a relevance of said acquired video data based on the at least one action class assigned.

16. The processor-readable medium of claim 15 wherein said extracted features comprise at least one of:
 deep features, wherein said deep features are learned via the use of at least one of:
  a long-short term memory network;
  a convolutional network;
  an autoencoder; and
  a deep Boltzmann machine; and
 hand-engineered features, wherein said hand-engineered features comprise at least one of:
  scale-invariant features;
  interest point and descriptors thereof;
  dense trajectories;
  histogram of oriented gradients; and
  local binary patterns.

* * * * *